Patented Oct. 28, 1952

2,615,810

UNITED STATES PATENT OFFICE 2,615,810

RETARDING THE STALING OF BAKERY PRODUCTS

Irwin Stone, New York, N. Y., assignor to Wallerstein Company, New York, N. Y., a corporation of New York No Drawing. Application March 4, 1948, Serial No. 13,083

6 Claims. (Cl. 99—91)

This invention relates to the inhibition, or prevention, of the staling of bread and other baked products.

The staling of bakery products incurs the loss of much money and causes the annual wastage of many millions of bushels of wheat. In normal times it has been estimated that the annual losses due to staling is 3.0 to 4.7% of total production.

Bread-staling processes can be divided into two parts: the staling of the crust and the staling of the crumb. The staling of the crust, which is relatively unimportant, changes the dry, crisp crust of fresh bread into a soft, leathery coating and is due mostly to transference of moisture from the center to the outside of the loaf. This staling is more noticeable in wrapped loaves. The staling of the crumb is of much more importance and is what is commonly recognized as staling. The texture of the crumb becomes harder, tougher, and more crumbly and increasingly opaque as the bread stales.

A principal object of the invention is to provide a process for the making of bakery products having improved resistance to staling.

Another object is to provide an anti-staling composition for treating baker's dough.

Further objects will appear hereinafter.

In the following discussion, when the term "bread" is used it is also implied that other bakery products such as rolls, muffins, biscuits, doughnuts, crackers or cake are also included.

Although the staling of the crumb is a complicated process not fully understood and as to the mechanism of which there are many conflicting theories, I have found that by the addition of small amounts of a heat-stable amylolytic enzyme to the dough before baking, that it is possible to prevent, or inhibit, or retard the rate of staling of bread. This heat-stable enzyme may be obtained from bacterial sources and is characterized by strong starch liquefying and dextrinizing power, alpha amylase activity, and proteolytic activity. The enzyme may be obtained, for example, from certain species of *Bacillus mesentericus* and *B. subtilis* and includes enzymes which are stable up to temperatures of 80° C. to 90° C. Such enzyme preparations of bacterial amylases of high heat stability and strong starch liquefying and dextrinizing power are commercially available.

Although the invention is not dependent on any theory, I believe that the action of this enzyme in baking is somewhat as follows: In the amounts employed, the enzyme produces substantially no effect at the low temperatures encountered in the preparation and rising of the dough. At the temperatures at which the bread is baked, the starch gelatinizes and the enzyme partially degrades this gelatinized starch at the high temperatures of the bread during the baking process. The amounts of these heat-stable enzymes added to the dough are very small and have to be controlled within a narrow range because it is easily possible to over-treat the bread. In case of over-treating by using too much of the enzyme the crumb becomes soft, pasty, doughy, and sticky and the crumb character may even be completely destroyed. When used in the proper proportion, this enzyme acts upon the starch of the crumb at the high temperatures of baking after the starch is gelatinized and partly degrades it to a form which, if current theories are assumed correct, no longer retrogrades and stales.

I am aware that amylolytic enzymes are present normally in flour and that their supplementation in baking has been recommended. In fact, it is standard practice to add malt as a supplement either to a flour or to a bread formula in order to help produce the fermentable sugars used by the yeast in causing the bread to rise. However, all of the enzymes that have been used for this purpose are heat-labile and the added enzyme activity is destroyed by the heat of the baking before the starch gelatinizes and before the enzymes have had a chance to act upon the gelatinized starch. The action of these customary enzymes is to partially attack the raw starch granules at low temperatures, producing fermentable sugars. The heat-stable enzymes that I employ are used in amounts so small that they have practically no action on the raw starch in the bread dough and do not produce significant amounts of fermentable sugars. In fact, these heat-stable enzymes are poor producers of fermentable sugars, but are very active in the partial degradation and thinning of starches.

In the customary use of enzymes for the low temperature production of fermentable sugars in baking, only heat-labile enzymes can be used. If a heat-stable type of enzyme were employed for the production of fermentable sugars, the amount required for the fermentation would of necessity be so large that during the baking process the crumb structure of the bread would be completely destroyed and the interior of the bread would be liquefied.

I have found that only very small amounts of the specific heat-stable enzymes are needed to produce the desired effect. In the case of a bread formula only about 0.005%, on the weight of the flour, of a bacterial enzyme preparation having an alpha amylase activity of about 200 SKB units per gram of the enzyme preparation may be required. Alpha amylase activity may be conveniently determined by the method of Sandstedt, Kneen & Blish (S. K. B. units) as described in "Cereal Chemistry," vol. 16, page 712 (1939). This amount of enzyme is insufficient to produce any change in the dough before baking, but at the baking temperatures, the heat-stable enzyme is activated by the high temperatures and then produces its effect.

While the enzyme is normally quite stable, the addition of small amounts of calcium ion to a bread formula, which may be deficient in calcium ions, tends to increase this heat stability, thereby making it possible to use smaller amounts of enzyme to get the desired effect.

*Example I*

| | Parts |
|---|---|
| Flour | 100 |
| Dry skim milk | 4 |
| Shortening | 3 |
| Sugar | 6 |
| Salt | 1.5 |
| Yeast | 2 |
| Malt extract | 0.25 |
| Potassium bromate | 0.003 |
| Bacterial alpha amylase preparation[1] | 0.005 |
| Water | about 75 |

[1] A purified enzyme having an alpha amylase activity of 200 SKB units per gram. Less pure enzymes may also be employed if an amount of equivalent activity is employed.

The dry ingredients, flour, skim milk powder, salt, and sugar are mixed and the shortening worked in. The yeast, malt extract and bromate are dissolved in a portion of the water. The heat-stable bacterial amylase may either be added dry or dissolved in a portion of the water. All ingredients are then mixed in the usual manner to form a dough. The dough is allowed to rise in a warm place (about 30° C.) for an hour and three quarters. It is then given the first punch and placed back in the warm place. After 50 minutes it is given the second punch and placed back in the warm place. In 25 minutes the dough is divided, molded and placed into pans. The pans are put in the warm place to rise for 55 minutes. They are then baked for 25 minutes at 220–225° C.

This is an average straight dough bread baking procedure. My anti-staling method is also applicable to the sponge dough method of baking bread without any change in the customary procedure except to add the heat-stable amylolytic enzyme. This enzyme may be added either in the sponge or in the dough, or a portion may be added to both.

*Example II*

| | Parts |
|---|---|
| Flour | 100 |
| Sugar | 5 |
| Salt | 1 |
| Yeast | 2.5 |
| Malt extract | 0.25 |
| Water | about 75 |
| Bacterial alpha amylase preparation[1] | 0.003 |

[1] The bacterial alpha amylase preparation is a purified enzyme material having an alpha amylase activity of 200 SKB units per gram. A less pure bacterial amylase may be substituted if the amounts of equivalent activity are maintained.

The procedure for mixing and baking is the customary one and is similar to that given in Example I.

The optimum range of the enzyme concentration is that range which produces a slight partial degradation of the gelatinized starch without producing a gross visible change in the crumb structure of the bread. I have found that the addition of the heat-stable amylolytic enzyme in amounts in the range equivalent to about ¼ to about 2 SKB alpha amylase units per 100 grams of flour is generally sufficient to retard and inhibit staling. This range would be equivalent to from about 0.00125% to about 0.010%, on the weight of flour, of a purified bacterial amylase having an activity of 200 units per gram. The optimum range of activity is not a fixed quantity but is dependent upon several factors among which, size of loaf, temperature of baking, concentration of calcium ions, bread formula employed, and type of flour are of importance.

While the optimum range of enzyme additive as given in the previous paragraph is preferred, it is possible in some cases to employ as little as 0.1 SKB alpha amylase units of heat-stable enzymatic preparation per 100 grams of flour to obtain the desired anti-staling effect. Also, in certain cases it is possible to use as much as 3 or 4 SKB units per 100 grams of flour without producing undesired changes in crumb structure.

My anti-staling process is also applicable to cakes and other bakery products. In cakes, due to the use of increased amounts of shortening the tendency toward staling is generally somewhat less. For this reason the amounts of heat-stable enzyme needed to give the desired anti-staling effect may be less than is required for bread. However, this varies considerably with the recipe employed, baking temperatures and other factors, but generally the range will not be far from that of bread.

Widespread use of the recent important development of canned bread is limited to a large extent by the staling of the bread in the cans. Although such canned bread may remain fresh for some time, it firms up eventually and becomes stale in the can. I have found that bread, baked by my process in which the dough contains heat-stable amylolytic enzymes, can be canned and still not undergo this crumb staling or firming which heretofore has prevented the widespread use of this canning process.

The term "dough" as used in the following claims has a broad meaning and includes not only conventional bread doughs but also cake batters, cracker mixes and other uncooked baker's products. The term "flour" is also used in a broad sense to include meal and other starchy ingredients of bread.

I claim:

1. The process of making bakery products having inhibited staling qualities which comprises incorporating in a dough a heat-stable alpha amylase enzymatic preparation in amounts equivalent to from 0.1 to 4 SKB alpha amylase units per 100 grams of flour in the dough, said enzymatic preparation being of such thermal stability that effective amounts of alpha amylase enzyme are present and active in the crumb at temperatures above the starch gelatinization point, and thereafter baking the dough.

2. The process of making bakery products having inhibited staling qualities which comprises incorporating in a dough a heat-stable bacterial alpha amylase enzymatic preparation in amounts equivalent to from 0.1 to 4 SKB alpha amylase units per 100 grams of flour in the dough, said enzymatic preparation being of such thermal stability that effective amounts of alpha amylase enzyme are present and active in the crumb at temperatures above the starch gelatinization point, and thereafter baking the dough.

3. The process of making bakery products having inhibited staling qualities which comprises incorporating in a dough a member of the group consisting of heat-stable bacterial alpha amylase enzymatic preparations derived from *Bacillus mesentericus* and *Bacillus subtilis* in amounts equivalent to from 0.1 to 4 SKB alpha amylase units per 100 grams of flour in the dough, said enzymatic preparation being of such thermal stability that effective amounts of alpha amylase enzyme are present and active in the crumb at temperatures above the starch gelatinization point, and thereafter baking the dough.

4. The process of making bakery products having inhibited staling qualities which comprises incorporating in a dough a heat-stable alpha amylase enzymatic preparation in amounts equivalent to from ¼ to 2 SKB alpha amylase units per 100 grams of flour in the dough, said enzymatic preparation being of such thermal stability that effective amounts of alpha amylase enzyme are present and active in the crumb at temperatures above about 80° C. in the crumb and thereafter baking the dough.

5. The process of making bakery products having inhibited staling qualities which comprises incorporating in a dough a heat-stable bacterial alpha amylase enzymatic preparation in amounts equivalent to from ¼ to 2 SKB alpha amylase units per 100 grams of flour in the dough, said enzymatic preparation being of such thermal stability that effective amounts of alpha amylase enzyme are present and active in the crumb at temperatures above about 80° C. in the crumb and thereafter baking the dough.

6. The process of making bakery products having inhibited staling qualities which comprises incorporating in a dough a member of the group consisting of heat-stable bacterial alpha amylase enzymatic preparations derived from *Bacillus mesentericus* and *Bacillus subtilis* in amounts equivalent to from ¼ to 2 SKB alpha amylase units per 100 grams of flour in the dough, said enzymatic preparation being of such thermal stability that effective amounts of alpha amylase enzyme are present and active in the crumb at temperatures above about 80° C. in the crumb and thereafter baking the dough.

IRWIN STONE.

REFERENCES CITED

The following references are of record in the file of this patent:

UNITED STATES PATENTS

| Number | Name | Date |
|---|---|---|
| 1,222,304 | Kohman | Apr. 10, 1917 |
| 2,114,694 | Wilhartz | Apr. 19, 1938 |

FOREIGN PATENTS

| Number | Country | Date |
|---|---|---|
| 171,991 | Great Britain | of 1921 |

OTHER REFERENCES

Special Report No. 15, Staling and Keeping Quality of Bread, Research Ass'n. of British Flour Millers, November 1936, page 15.

Read et al.: Cereal Chemistry, 13, 1936, pages 14 to 37.

Munz et al.: Cereal Chemistry, XIC 4, July 1937, pages 453–457.

Anderson: Enzymes of Wheat Technology, Interscience Pub., N. Y. 1946, pages 67, 68.